(12) United States Patent
Pleil et al.

(10) Patent No.: US 12,433,715 B2
(45) Date of Patent: Oct. 7, 2025

(54) IMPLANT SYSTEM

(71) Applicant: Aesculap AG, Tuttlingen (DE)

(72) Inventors: Thomas Pleil, Bad Duerrheim (DE); Thomas Scholten, Tuttlingen (DE)

(73) Assignee: Aesculap AG, Tuttlingen (DE)

( * ) Notice: Subject to any disclaimer, the term of this patent is extended or adjusted under 35 U.S.C. 154(b) by 822 days.

(21) Appl. No.: 17/739,252

(22) Filed: May 9, 2022

(65) Prior Publication Data
US 2022/0257337 A1 Aug. 18, 2022

Related U.S. Application Data

(63) Continuation of application No. PCT/EP2020/081993, filed on Nov. 13, 2020.

(30) Foreign Application Priority Data

Nov. 15, 2019 (DE) ...................... 10 2019 130 938.7

(51) Int. Cl.
*A61B 17/122* (2006.01)
*A61B 17/128* (2006.01)
*A61B 90/92* (2016.01)

(52) U.S. Cl.
CPC .......... *A61B 90/92* (2016.02); *A61B 17/1227* (2013.01); *A61B 17/128* (2013.01)

(58) Field of Classification Search
CPC ......... A61B 90/90; A61B 90/92; A61B 17/08; A61B 17/083; A61B 17/10; A61B 17/122;

(Continued)

(56) References Cited

U.S. PATENT DOCUMENTS 4,671,916 A * 6/1987 Hamas .................. A61B 90/00
29/451
5,573,529 A * 11/1996 Haak ...................... A61B 90/92
606/1

(Continued)

FOREIGN PATENT DOCUMENTS

| DE | 19534831 A1 | 3/1997 |
|---|---|---|
| DE | 19837929 A1 | 3/2000 |
| EP | 2457530 A1 | 5/2012 |

OTHER PUBLICATIONS

Written Opinion received in International Application No. PCT/EP2020/081993 dated Feb. 17, 2021, with translation, 12 pages.

(Continued)

*Primary Examiner* — Kathleen S Holwerda
(74) *Attorney, Agent, or Firm* — Christopher A. Rothe; CM Law

(57) ABSTRACT

An implant system includes at least two differing color-coded implants and at least two differing color-coded medical instruments. A color coding of the at least two instruments corresponds to a color coding of the at least two implants. The coding of the at least two medical instruments includes at least one coding element. The at least two medical instruments each comprise a first tool element and at least one second tool element for jointly handling one of the at least two implants. The first tool element and the at least one second tool element are movable relative to one another and are arranged or formed on a distal end of the respective instrument. The at least two instruments each include an actuating device.

15 Claims, 7 Drawing Sheets

(58) Field of Classification Search
CPC ............ A61B 17/1222; A61B 17/1227; A61B 17/128; A61B 17/1285; A61B 17/3468; A61F 2/95–97
USPC ................ 606/139, 142–143, 151, 157, 158, 606/205–212
See application file for complete search history.

(56) References Cited

U.S. PATENT DOCUMENTS

| | | | |
|---|---|---|---|
| 5,822,865 | A | 10/1998 | Bosch et al. |
| 6,981,618 | B2* | 1/2006 | Reisinger .......... B05C 17/00593 222/326 |
| 7,905,886 | B1* | 3/2011 | Curran .................. A61F 2/4611 606/99 |
| 2003/0208214 | A1* | 11/2003 | Loshakove ........ A61B 17/0644 606/153 |
| 2005/0033333 | A1* | 2/2005 | Smith .................. A61B 17/122 606/158 |
| 2014/0276037 | A1* | 9/2014 | Johnson ............. A61B 10/0266 600/431 |
| 2015/0018875 | A1 | 1/2015 | Knodel |
| 2016/0113652 | A1 | 4/2016 | Schulz |

OTHER PUBLICATIONS

Search Report received in International Application No. PCT/EP2020/081993 dated Feb. 17, 2021, with translation, 4 pages.

* cited by examiner

IMPLANT SYSTEM

CROSS-REFERENCE TO RELATED APPLICATIONS

This application is a continuation of International Application No. PCT/EP2020/081993, filed on Nov. 13, 2020, and claims priority to German Application No. 10 2019 130 938.7, filed on Nov. 15, 2019. The contents of International Application No. PCT/EP2020/081993 and German Application No. 10 2019 130 938.7 are incorporated herein by reference in their entireties and for all purposes.

FIELD

The present invention relates to implant systems comprising at least two differing color-coded implants and comprising at least two differing color-coded medical instruments generally, and more specifically to an implant system comprising at least two differing color-coded implants and comprising at least two differing color-coded medical instruments, wherein a color coding of the at least two instruments corresponds to a color coding of the at least two implants, wherein the coding of the at least two medical instruments comprises at least one coding element wherein the at least two medical instruments each comprise a first tool element and at least one second tool element for jointly handling one of the at least two implants, wherein the first tool element and the at least one second tool element are movable relative to one another and are arranged or formed on a distal end of the respective instrument, wherein the at least two instruments each comprise an actuating device, which is arranged or formed on a proximal end of the instrument and cooperating with the at least two tool elements for moving the first tool element and the at least one second tool element relative to one another as a result of an actuation of the actuating device.

BACKGROUND

Implant systems of the kind described at the outset are used, in particular, when the association between an implant and the instrument provided therefor, for example an application instrument, is to be simplified for a user. Colored markings, also called codings, serve this purpose.

It is known to create a color coding by means of anodic oxidation in the case of instruments made of titanium. However, a coloring of the instruments in this way fades with increasing number of completed processing cycles or, in the worst case, can change its color.

Alternatively hereto, and in particular in the case of instruments made of surgical steel, coding elements made of plastic material are used as color markings, which are screwed onto the instruments or are fixed to the instruments by means of interference fit. However, coding elements of that kind harbor the risk that they can loosen or completely detach from the instrument and thereby get lost. In particular, a detachment of the coding element from the instrument during a surgical procedure is absolutely unacceptable.

A securing of the coding elements on the instrument with adhesives is possible in principle, but this often leads to biocompatibility problems. Apart from this, it must be taken into consideration that adhesives age and thereby lose their function, thereby increasing the risk that the coding element undesirably detaches from the instrument.

SUMMARY

In a first aspect of the invention, an implant system comprises at least two differing color-coded implants and comprises at least two differing color-coded medical instruments. A color coding of the at least two instruments corresponds to a color coding of the at least two implants. The coding of the at least two medical instruments comprises at least one coding element. The at least two medical instruments each comprise a first tool element and at least one second tool element for jointly handling one of the at least two implants. The first tool element and the at least one second tool element are movable relative to one another and are arranged or formed on a distal end of the respective instrument. The at least two instruments each comprise an actuating device, which is arranged or formed on a proximal end of the instrument and cooperating with the at least two tool elements for moving the first tool element and the at least one second tool element relative to one another as a result of an actuation of the actuating device. The at least one coding element is arranged on the first tool element and the at least one second tool element secures the at least one coding element in a working position of the respective instrument, in which the first tool element and the at least one second tool element are movable relative to one another between a first extreme position and a second extreme position, on the first tool element against a movement in the direction toward the second tool element.

BRIEF DESCRIPTION OF THE DRAWING FIGURES

The foregoing summary and the following description may be better understood in conjunction with the drawing figures, of which:

DETAILED DESCRIPTION

Figure 1:
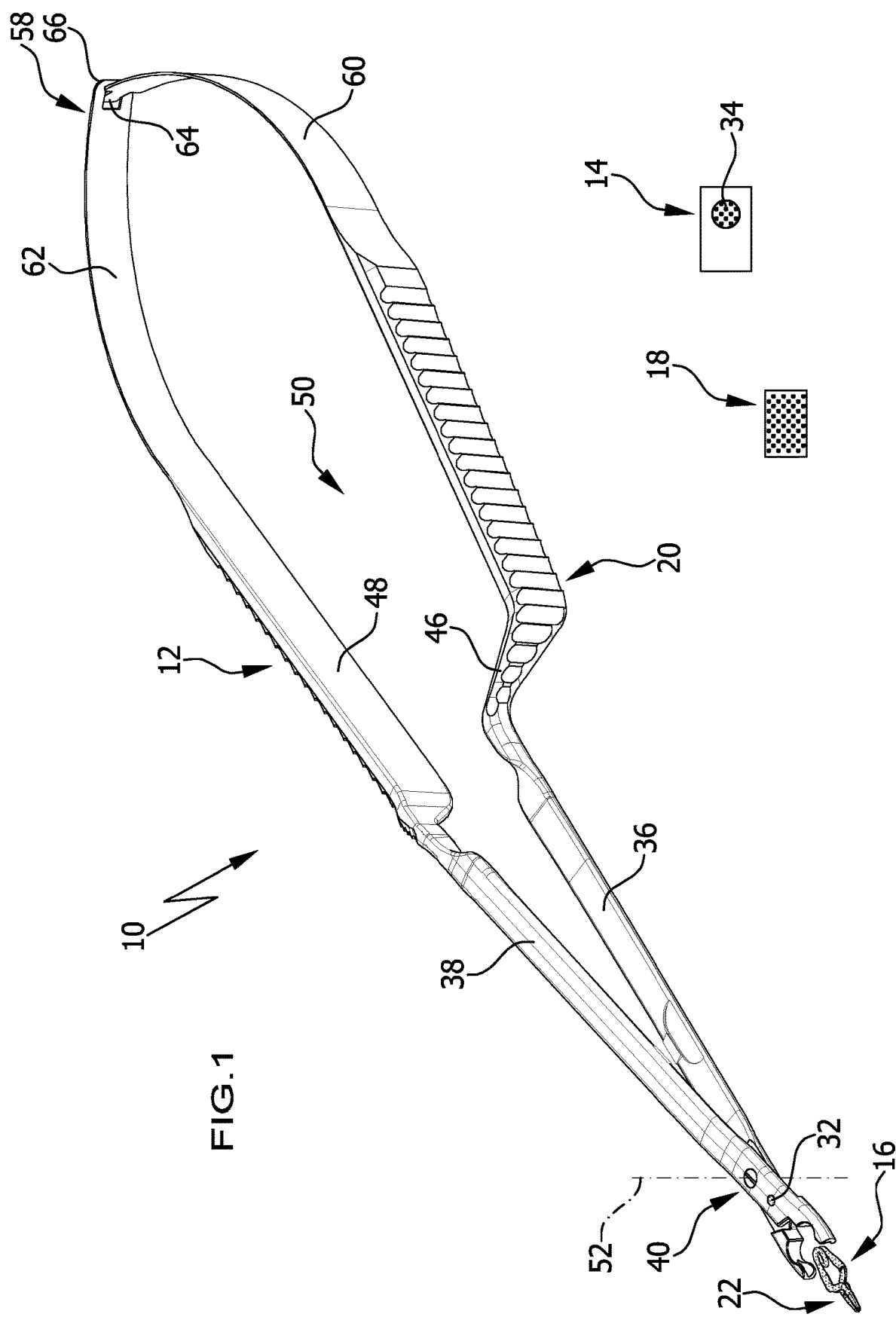
FIG. 1 shows a perspective total view of a first embodiment of an implant system.
Figure 2:
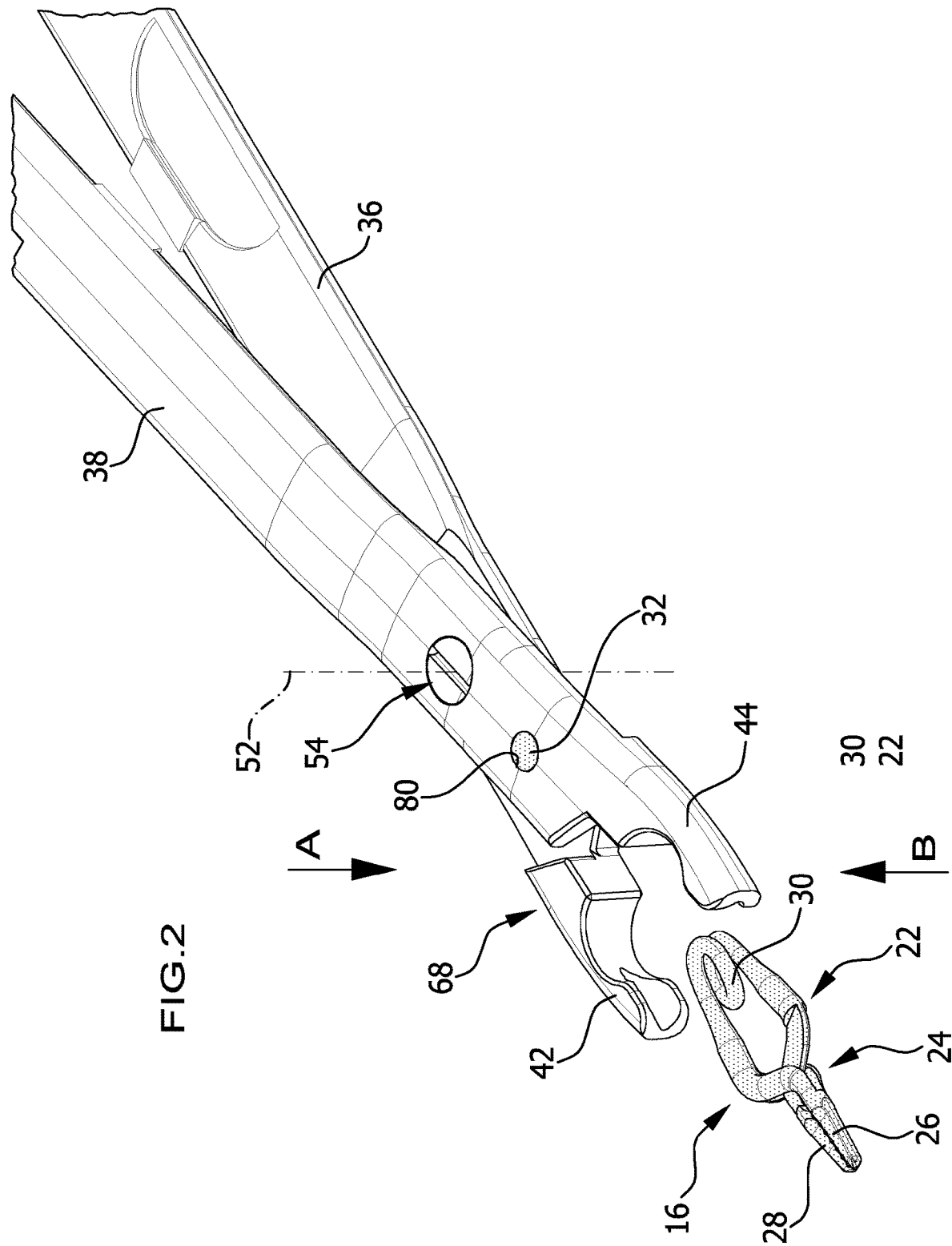
FIG. 2 shows an enlarged partial view of the arrangement from FIG. 1.
Figure 3:
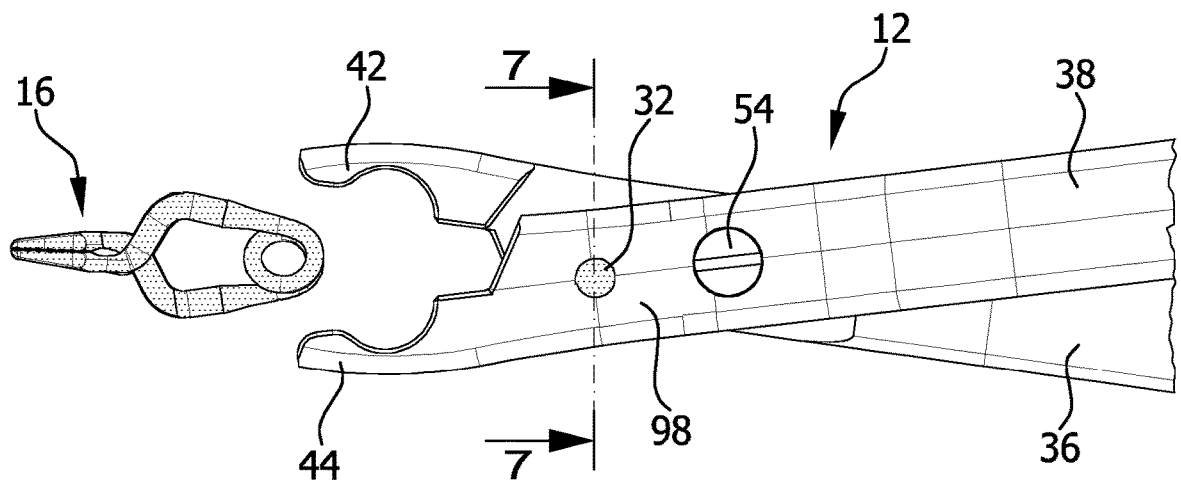
FIG. 3 shows a view in the direction of arrow A in FIG. 2.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to an implant system comprising at least two differing color-coded implants and comprising at least two differing color-coded medical instruments, wherein a color coding of the at least two instruments corresponds to a color coding of the at least two implants, wherein the coding of the at least two medical instruments comprises at least one coding element, wherein the at least two medical instruments each comprise a first tool element and at least one second tool element for jointly handling one of the at least two implants, wherein the first tool element and the at least one second tool element are movable relative to one another and are arranged or formed on a distal end of the respective instrument, wherein the at least two instruments each comprise an actuating device, which is arranged or formed on a proximal end of the instrument and cooperating with the at least two tool elements for moving the first tool element and the at least one second tool element relative to one another as a result of an actuation of the actuating device, wherein the at least one coding element is arranged on the first tool element and wherein the at least one second tool element secures the at least one coding element in a working position of the respective instrument, in which the first tool element and the at least one second tool element are movable relative to one another between a first extreme position and a second extreme position, on the first tool element against a movement in the direction toward the second tool element.

The object is achieved in accordance with the invention with an implant system of the kind described at the outset in that the at least one coding element is arranged on the first tool element and in that the at least one second tool element secures the at least one coding element in a working position of the respective instrument, in which the first tool element and the at least one second tool element are movable relative to one another between a first extreme position and a second extreme position, on the first tool element against a movement in the direction toward the second tool element.

As a result of the proposed further development of the implant system, the tool elements are used, in particular, to, for one, hold the at least one coding element and, for another, to secure the at least one coding element on the first tool element in the working position. Thus, a loss of the at least one coding element, in particular during a surgical procedure, can be prevented, because the at least one coding element, even if a connection to the first tool element would release, is not able to fall off the first tool element. This is prevented by the at least one second tool element. Said second tool element practically forms a stop or a movement delimitation for the at least one coding element in a direction away from the first tool element in the direction toward the second tool element. The proposed further development makes it possible, in particular, to forgo the use of adhesives. A loss or an undesired detachment of the at least one coding element from the first tool element and an associated loss thereof, in particular during a surgical procedure, can thus be, in particular, effectively prevented. Further, an easy association of implant and associated instrument is possible due to the color coding. The color codings on the implant and on the associated or corresponding instrument preferably match, such that an unambiguous association is possible for a user, i.e., as to which instrument the user is to use for the handling of which implant.

It is favorable if each instrument comprises at least two coding elements and if at least one of the at least two coding elements is arranged on the first and/or on the at least one second tool element. Thus, in particular, a differentiation of the various instruments can be improved. For example, a coding element may be arranged on each tool element, such that the coding of the instrument is always easily visible, namely independently of how the instrument is set down or held.

It is advantageous if the first tool element and the at least one second tool element are arranged or formed so as to be displaceable or pivotable about a pivot axis relative to one another. Thus, in particular, forceps-like or scissor-like instruments can be formed. For example, the tool elements that are pivotable relative to one another may also be arranged on distal ends of tubular or sliding shafts. For example, a securing of a coding element can also be achieved by a second tool element that is displaceable relative to the coding element. For example, this can be made possible by a displacement of the second tool element relative to the first tool element in parallel to a longitudinal axis of the instrument.

The instrument can be configured in a simple manner if the first tool element and the at least one second tool element are coupled or connected to one another by a pivot member defining the pivot axis. Thus, mouth parts defining an instrument mouth can thus be created by the two or more tool elements, namely both in the case of a scissor-like instrument with rigid branches and in the case of a tubular shaft instrument or a sliding shaft instrument.

A coupling of the tool elements to one another is possible in a simple manner, in particular, by the pivot member being configured in the form of a connecting screw or in the form of a rivet.

In accordance with a further preferred embodiment of the invention, provision may be made that the first tool element and the at least one second tool element are mounted against one another so as to be movable in a bearing region and that the at least one coding element is arranged on the first tool element on the distal side of the bearing region. For example, the bearing region may be a connection region of the instrument in which the tool elements are coupled to one another, for example with a pivot member. The coding of the instrument is easily visible as a result of the arrangement of the at least one coding element on the distal side of the bearing region. Further, the coding of the instrument is near to the implant handled with the instrument. This makes it possible for a user to easily and securely visually check whether the suitable instrument was selected for the respective implant. This is the case if the color codings match or correspond to one another, for example have the same color. A correct association is not the case if the color codings differ, for example because the color of the coding element is a different color than the color of the implant.

It is favorable if the first tool element has a coding element receptacle and if the at least one coding element is at least partially, in particular completely, held in the coding element receptacle in a force-locking and/or positive-locking manner and/or by material bond. The at least one coding element may be completely accommodated in the coding element receptacle or protrude partially therefrom. The coding element receptacle makes it possible, in particular, to hold the at least one coding element, in particular in the working position, securely on the first tool element. In particular, the coding element receptacle may be configured to prevent a movement of the at least one coding element in a direction away from the at least one second tool element. This can be achieved by means of a force-locking or positive-locking connection between the at least one coding element and the first tool element. Optionally, in addition or alternatively, the at least one coding element may also be connected to the instrument by material bond. Thus, in particular, an additional securing of the coding element on the instrument can be achieved.

It is advantageous if the at least one coding element is held in the coding element receptacle exclusively in a force-locking and/or positive-locking manner, in particular without adhesive, or exclusively by material bond. It can thus, for example, be fixed either completely without adhesive or the like, thereby lengthening the service life of the instrument, or the coding element can be fixed exclusively by material bond, for example by adhesion, soldering, or welding, which minimizes a production expenditure.

The at least one coding element can be connected to the first tool element in a simple manner if the at least one coding element is screwed into the coding element receptacle. Alternatively, it may also be pressed in in a positive-locking manner.

The coding element receptacle preferably comprises a perforation. A perforation makes it possible, in particular, that the at least one coding element accommodated and held in the coding element receptacle is easily recognizable. A user can thus directly recognize which color the coding element held in the coding element receptacle has when they look at an outer surface of the first tool element that faces away from the second tool element.

The at least one coding element can be fixed in the coding element receptacle in a simple manner if the perforation has an internal thread. The coding element can thus be screwed into the coding element receptacle.

It is advantageous if the at least one coding element has an external thread corresponding to the internal thread. Such a configuration facilitates the connection of the at least one coding element to the first tool element.

To further reduce the risk of a detachment of the at least one coding element from the first tool element, it is advantageous if the perforation tapers at least in sections in a direction pointing away from the at least one second tool element. It may also taper over its entire length. The perforation thus forms a stop and thereby a securing device for the at least one coding element on the first tool element. A movement of the first tool element away from the second tool element through the perforation can thus be securely prevented.

The production of the instrument can be simplified, in particular, by the coding element receptacle defining a coding element receptacle longitudinal axis, which extends in parallel or substantially in parallel to the pivot axis. A coding of the instrument can thus be easily recognized when the bearing region of the instrument is visible.

It is favorable if the first tool element has a thickness in a direction parallel to the coding element receptacle and if a length of the coding element corresponds to at most about the thickness of the tool element. In particular, it is thus possible to configure the coding element to be flush on both sides, i.e., on one side with an outer side of the first tool element that faces away from the second tool element and on the other side with a side face of the first tool element that faces in the direction toward the second tool element.

It is advantageous if the coding element receptacle has a viewing opening pointing away from the at least one second tool element and an insertion opening pointing in the direction toward the at least one second tool element, and if a cross sectional area of the viewing opening is smaller than a cross sectional area of the insertion opening. This configuration makes it possible, in particular, to secure, in a simple manner, the at least one coding element in the coding element receptacle against falling out through the viewing opening. Through the selection of the cross sectional areas of the viewing opening and the insertion opening, the at least one coding element can, for example, be introduced into the coding element receptacle exclusively through the insertion opening. It is then practically impossible to pass through the coding element receptacle through the viewing opening.

It is favorable if the insertion opening in the working position is at least partially, in particular completely, covered or closed by the at least one second tool element. In this way, the at least one second tool element can secure the at least one coding element in the coding element receptacle against falling out when the instrument adopts the working position.

To be able to clean the instrument in a simple and secure manner, it is favorable if the instrument can be brought from the working position into a processing position in which the first tool element and the at least one second tool element are moved relative to one another beyond one of the two extreme positions, and if the at least one second tool element releases the at least one coding element, in particular unblocks the insertion opening, in the processing position. For example, in the processing position, the tool elements can be pivoted relative to one another by 90° or more. In each case, in the processing position, they are moved relative to one another so far that the at least one second tool element no longer covers the at least one coding element, not even partially. This can be achieved, in particular, by the at least one second tool element unblocking the insertion opening in the working position.

The at least one coding element is preferably secured in the coding element receptacle, in particular in the processing position, by material bond with the first tool element and/or by plastic deformation together with the first tool element. This further development makes it possible, in particular, to prevent an unintentional detachment of the at least one coding element in the processing position from the first tool element with great security. Material bonding can be achieved, in particular, by welding or soldering. A plastic deformation can lead, in particular, to a local positive engagement, which prevents a movement of the at least one coding element relative to the coding element receptacle.

The at least one coding element can be secured in the coding element receptacle in a simple manner if it is secured therein by crushing or destroying at least one thread of the external thread and/or the internal thread. For example, the destruction of the thread can be achieved by means of laser welding. A crushing of at least one thread can be effected, e.g., mechanically with a tool that is suitable therefor. It can thus be prevented, in particular, that the at least one coding element can be unscrewed from the coding element receptacle.

In accordance with a further preferred embodiment of the invention, provision may be made that an end of the at least one coding element pointing away from the at least one second tool element is arranged or formed flush or substantially flush with a side face of the first tool element facing away from the at least one second tool element. Thus, in particular, an end face of the coding element that extends transversely to the coding element longitudinal axis can be integrated practically seamlessly into the side face of the first tool element. In other words, a flush fit of the coding element can thus be achieved.

The assembly of the implant system can be simplified, in particular, by the at least one coding element having a tool engagement element that is open facing in the direction toward the at least one second tool element. In particular, the tool engagement element may be configured in the form of a slit, an inner polygonal socket, or an inner multilobular socket. Such a configuration simplifies, in particular, the introduction, for example the screwing, of the at least one coding element into the coding element receptacle.

Advantageously, at least one coding element is arranged on the at least one second tool element in an analogous manner as on the first tool element. As indicated above, it is thus possible, in particular, to equip both or all tool elements with a coding element. If the coding element is arranged on the at least one second tool element, the first tool element prevents the coding element from passing through in the direction toward the first tool element. Arranging two or more coding elements on the instrument has the advantage, in particular, that a user can easily recognize the coding of the instrument, independently of a location or orientation thereof.

It is favorable if at least one of the at least two instruments comprises at least two coding elements and if at least one of the at least two coding elements is arranged or formed on the actuating device. An instrument can thus, in particular, still be reliably identified, even when the coding element arranged or formed on one of the tool elements is no longer recognizable, for example due to contamination, or when the coding element is covered by body tissue during a surgical procedure. In particular, two, three or more coding elements may be arranged on the actuating device, thereby further improving an association of the instrument with an implant.

The handling of the implant system can be further simplified, in particular, if the actuating device comprises two actuating elements that are movable, in particular pivotable, relative to one another. Such a configuration of the actuating device enables, in particular, the handling of the instrument in the manner of scissors. For example, the actuating device may comprise two branches that are pivotable relative to one another and that are rigidly coupled to the tool elements or are coupled thereto by way of a force transmission member. Thus, scissor-like instruments, on the one hand, or also tubular shaft or sliding shaft instruments can be formed.

A simple structure of the at least two instruments can be achieved, in particular, by the two actuating elements being configured in the form of rigid branches and a distal end of each actuating element bearing or comprising a tool element.

The two actuating elements are favorably pivotable about the pivot axis. In particular, a simple structure of the instrument can thus be achieved.

It is advantageous if one of the at least two coding elements is arranged on at least one of the two actuating elements. In particular, at least one coding element may be arranged or formed on each of the two actuating elements. Two or more coding elements may be arranged or formed on each actuating element. An association of the instrument with an implant can still be securely made when the coding element arranged or formed on one of the tool elements is no longer recognizable, for example due to contamination or when the coding element is covered by body tissue during a surgical procedure.

Further, it may be advantageous if the instrument comprises a biasing device for exerting a biasing force holding the actuating device in an extreme position. For example, the biasing device holds the two actuating elements in an extreme position moved apart from one another to a maximum extent, in which the tool elements are at a maximum distance from one another. In particular, the extreme position that the biasing device defines may be a position in which the at least one instrument adopts the working position. It can thus, in particular, be ensured by the biasing device that the at least one coding element is secured on the first tool element, namely in particular when the at least one instrument is not actuated.

It is advantageous if the biasing device comprises at least one biasing element and if the two actuating elements are movable toward one another against the action of the at least one biasing element. For example, each actuating element may comprise a biasing element, which, for example, is also formed in one piece with the actuating element, in particular in the manner of a leaf spring. Free ends of the biasing elements that then form free ends of the respective actuating elements may, for example, be coupled to one another, in particular in a movable manner.

It is favorable if the biasing device is deactivatable for transferring the at least one medical instrument from the working position into the processing position. For example, the biasing device may define an extreme position in the working position, in which the actuating elements and, in particular, also the tool elements are at a maximum distance from one another. For example, biasing elements that are in engagement with one another in the working position can be brought out of engagement in order to transfer the actuating elements and the tool elements connected or coupled thereto from the working position into the processing position.

In accordance with a preferred embodiment of the invention, provision may be made that the at least two instruments are configured in the form of clip appliers. In particular, they may have differently formed tool elements in order to be able to handle differently sized implants in the form of clips.

It is advantageous if the at least two implants are configured in the form of surgical clips. In particular, they may be configured in the form of aneurysm clips. Implants of that kind may be used, in particular, to clamp vessels.

The implant system can be color-coded in a simple and cost-effective manner if the at least one coding element is made of a plastic or a metal.

In accordance with a further preferred embodiment of the invention, provision may be made that the at least two implants are made of an implant material, that the at least two corresponding coding elements are made of a coding element material, and that the implant material and the coding element material are identical. This configuration makes it possible, in particular, to achieve a color coding both of the implants and of the coding elements and thus of the instruments that is identical or at least nearly identical. A particularly good visual association between instrument and implant can thus be made possible.

A surface of the at least two implants and a surface of the at least two coding elements is preferably at least partially, in particular completely, colored or provided with a colored coating. A configuration of that kind enables, in particular, a very good visual association between implants and associated instruments.

It may be favorable if the at least one coding element is colored through or has a color-treated surface and if the at least two implants are color-coded in the same manner. If the at least one coding element and the at least two implants are color-coded in the same manner, a particularly good match of the color impression can be achieved, which facilitates an association of implant and instrument for the user.

An embodiment of an implant system is schematically depicted in FIG. 1 and is denoted as a whole with the reference numeral 10. The implant system 10 comprises a first medical instrument 12 and a medical instrument 14 schematically depicted in FIG. 1.

Further instruments may also be comprised in alternative embodiments of implant systems 10.

The implant system 10 further comprises a first implant 16 and second implant 18, schematically depicted in FIG. 1. The first instrument 12 and the second instrument 14 differ in at least one feature, for example a size or actuating force.

In order to differentiate the instruments 12 and 14, they are color coded, as is explained in detail below.

The instrument 12 is depicted in the Figures, as an example, in the form of a clip applier 20.

The first implant 16 is depicted in the Figures, as an example, as a surgical clip 22, namely in the form of an aneurysm clip 24.

To be able to differentiate the implants 16 and 18 from one another, they are color-coded. The first implant 16 is colored in a first color, the second implant 18 in a different color. Such a color-coding of the implants 16 and 18 and optionally further implants comprised by the implant system 10 makes it possible for a user to easily differentiate them.

The implants 16 and 18 may differ, in particular, in form and size as well as, for example, a closing or clamping force of two clamping arms 26 and 28, wherein the clamping force is applied by a spring element 30 of the clip 22.

To be able to securely select the appropriate instrument 12, 14 for handling the respective implant 16, 18, the instruments 12 and 14 are also color-coded. This purpose is served by a coding element 32 and 34, which is arranged on the respective instrument 12 and 14.

The instrument 12 depicted in the Figures comprises two elongate branches 36 and 38, which are movably mounted against one another in a bearing region 40. Distal ends of the branches 36 and 38 form first and second tool elements 42 and 44, between which an implant 16 or 18 can be accommodated and held.

The branches 36 and 38 form actuating elements 46 and 48 of an actuating device of the instrument 12, denoted as a whole with the reference numeral 50.

The actuating elements 46 and 48 are movable relative to one another, namely pivotable about a pivot axis 52. The tool elements 42 and 44 are thereby coupled to one another so as to be pivotable about the pivot axis 52.

The pivot axis 52 is defined by a pivot member 54. In the embodiment of the instrument 12 depicted in the Figures, said pivot member 54 is configured in the form of a connecting screw 56. In an alternative embodiment, the pivot member 54 may be configured in the form of a rivet.

The instrument 12 further comprises a biasing device 58 for exerting a biasing force holding the actuating device 50 in an extreme position.

The biasing device 50 comprises two biasing elements 60 and 62, which are arranged and configured in such a way that the two actuating elements 46 and 48 are movable toward one another against the action of the biasing elements 58 and 60.

The biasing elements 60 and 62 form proximal end portions of the actuating elements 46 and 48. Free ends 64 and 66 of the biasing elements 66 and 62, which thus also form free ends 64 and 66 of the actuating elements 46 and 48, are in engagement with one another and hold the instrument 12, as schematically depicted in FIG. 1, in an open position that defines a first extreme position.

When the actuating elements 46 and 48 are moved toward one another, the branches 36 and 38 are pivoted with the tool elements 42 and 44 formed thereon toward one another, such that an instrument mouth 68, which is defined by the two tool elements 42 and 44, closes.

In the working position of the instrument 12, the free ends 64 and 66 of the biasing elements 60 and 62 are in engagement. A further, i.e., second extreme position in the working position is defined by a maximally proximate position of the tool elements 42 and 44, i.e., when the instrument mouth 68 is closed, as is schematically depicted in the section in FIG. 7. A thusly defined closed position defines the second extreme position of the instrument mouth.

The tool elements 42 and 44 can be moved relative to one another between these two defined extreme positions when the free ends 64 and 66 of the biasing elements 60 and 62 are in engagement with one another as described and schematically depicted in FIG. 1.

Figure 5:
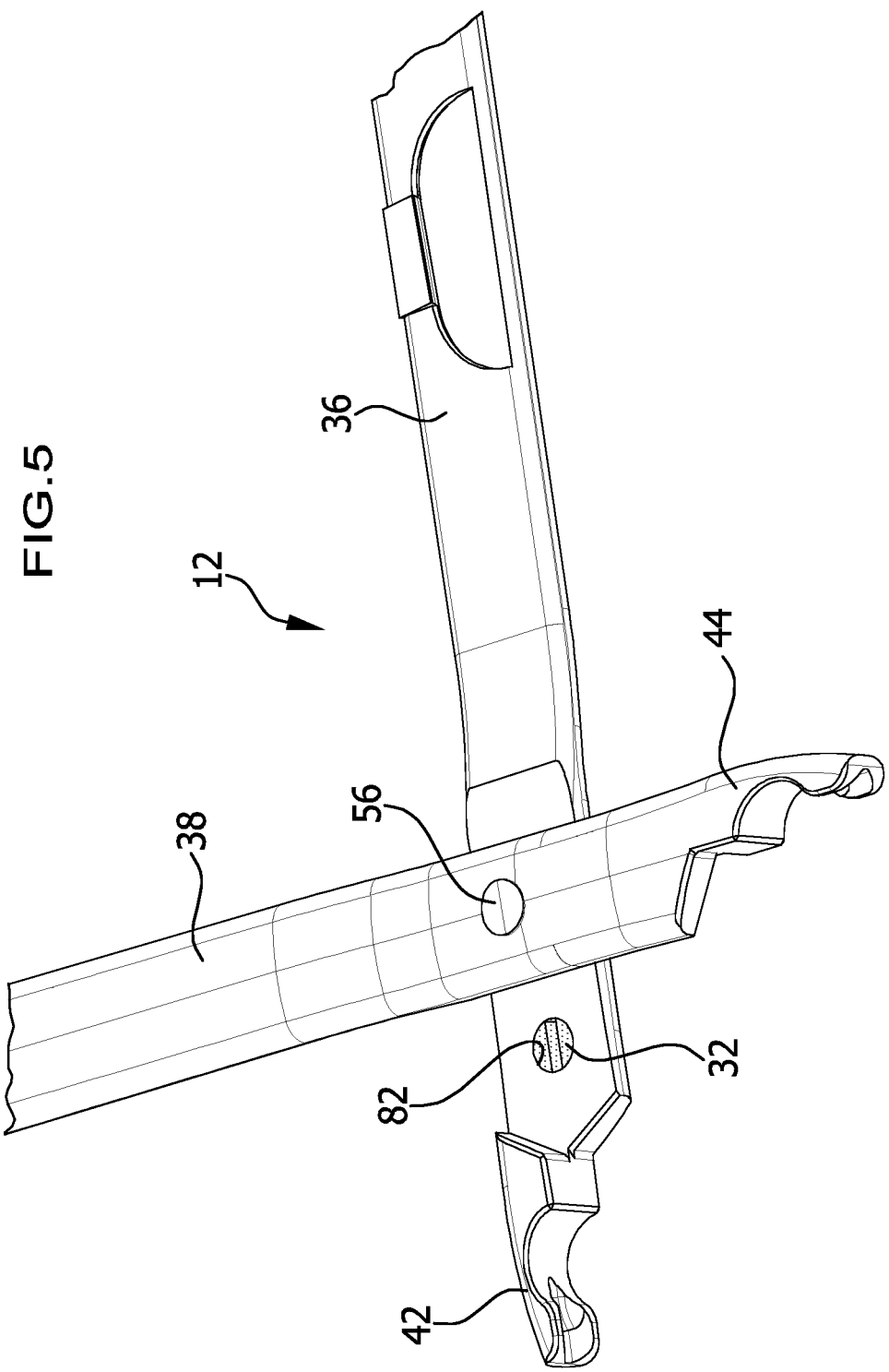
FIG. 5 shows a view similar to FIG. 4 of a distal end of an embodiment of a medical instrument in the processing position.
Figure 6:
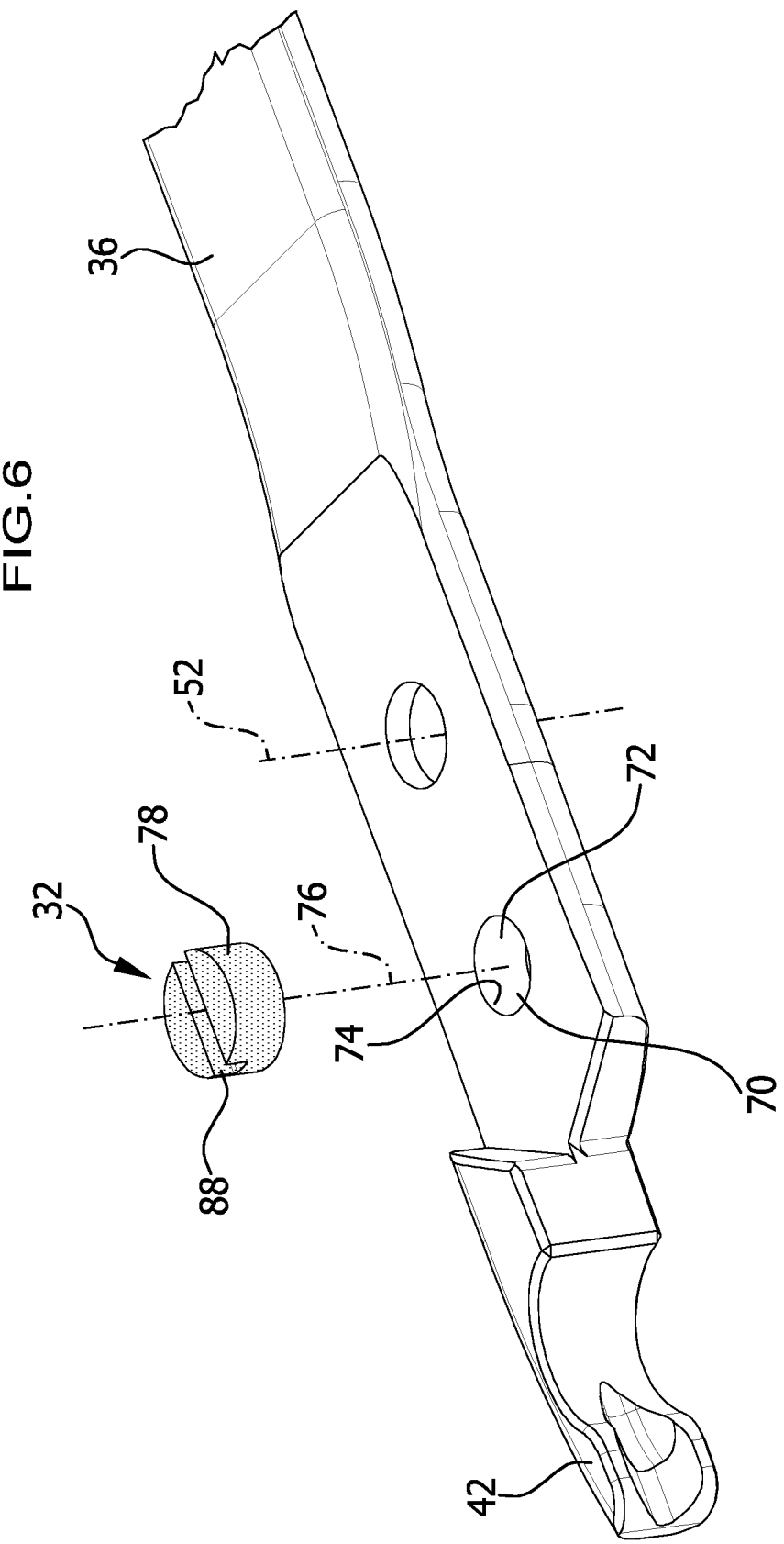
FIG. 6 shows a perspective partial view of a tool element before the insertion of a coding element.

When the free ends 64 and 66 are brought out of engagement, the branches 36 and 38 can be pivoted even further away from one another, for example into a position depicted in FIG. 5 in which the tool elements 42 and 44 are aligned approximately at a right angle relative to one another.

When the free ends 64 and 66 are out of engagement, the branches 36 and 38 can be pivoted relative to one another almost arbitrarily. When the tool elements 42 and 44 are further apart from one another than is the case in the open position, i.e., the first extreme position depicted in FIG. 1, the instrument 12 adopts a processing position. The instrument 12 is preferably stored in this position during washing and sterilizing, i.e., during processing.

As described, the biasing device 58 is thus deactivatable for transferring the instrument 12 from the working position into the processing position.

The coding element 32 is accommodated on the instrument 12 in a coding element receptacle 70. Said coding element receptacle 70 is formed on the first tool element 42 on the distal side of the pivot axis 52 and thus on the distal side of the bearing region 40.

The coding element receptacle 70 is configured in the form of a perforation 72.

In one embodiment, the perforation 72 comprises an internal thread 74.

The coding element receptacle 70 defines a coding element receptacle longitudinal axis 76, which extends in parallel to the pivot axis 52.

The coding element 32 has an external thread 78 corresponding to the internal thread 74. This makes it possible to screw the coding element 32 into the coding element receptacle 70.

The coding element receptacle 70 has a viewing opening 80 pointing away from the second tool element 44 and an insertion opening 82 pointing in the direction toward the second tool element 44. A cross sectional area of the viewing opening 80 is smaller than a cross sectional area of the insertion opening 82. This is achieved in the embodiments depicted in the Figures by a tapering portion 84 being formed between the insertion opening 82 and the viewing opening 80. The tapering portion adjoins a hollow-cylindrical bore portion 86 provided with the internal thread 74.

The coding element 32 further has a tool engagement element 88 in the form of a slit 90 that is open pointing in the direction toward the second tool element 44.

In alternative embodiments, the tool engagement element 88 is configured in the form of an inner polygonal socket or an inner multilobular socket.

Because the perforation 72, as described, tapers in sections in a direction pointing away from the second tool element 44, the coding element receptacle 70 can accommodate the coding element 32 in a positive-locking manner in such a way that the coding element 32 cannot pass through the viewing opening 80. The coding element 32 is secured on the first tool element 42 against falling out through the viewing opening as a result of the configuration of the coding element receptacle 70.

The coding element 32 is further also secured against falling out of the coding element receptacle 70 through the insertion opening 82.

A first securing element forms the second tool element 44, which keeps the insertion opening 82 in the working position at least partially covered or closed, and in different positions also completely covered or closed.

Figure 7:
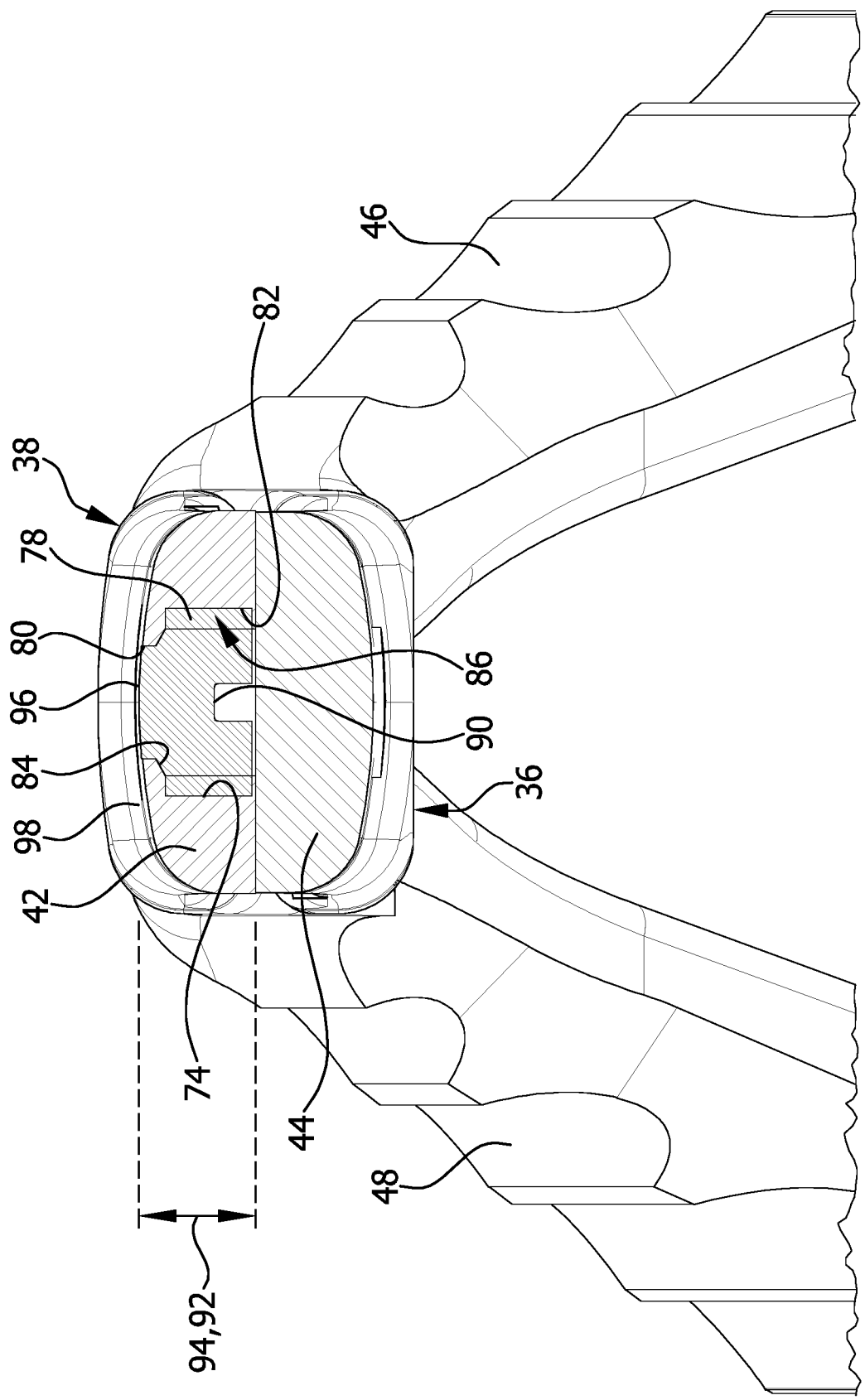
FIG. 7 shows a cut view along line 3-7 in FIG. 3 in the case of a closed instrument.

It can be easily seen in the cut view in FIG. 7 that the second tool element 44 in the closed position completely covers and thus closes the insertion opening 82. This can also be easily seen in FIG. 4. In the position of the tool elements 42 and 44 relative to one another depicted in FIG. 4, i.e., in the second extreme position, in the working position, i.e., in the position in which the biasing elements 60 and 62 are in engagement with one another with their free ends 64 and 66, the second tool element 42 completely covers the insertion opening 82, such that the coding element 32 is not visible.

However, the second tool element 44 completely unblocks the insertion opening 82 in the processing position, as is schematically depicted in FIG. 5. In the processing position, the tool elements 42 and 44 are moved relative to one another beyond one of the two defined extreme positions. In the embodiment depicted in the Figures, as already explained, the first extreme position is defined by a maximum opening of the instrument mouth 68 in which the free ends 64 and 66 of the biasing elements 60 and 62 are in engagement. Beyond this extreme position, the tool elements 42 and 44 are pivotable even further away from one another when the free ends 64 and 66 are brought out of engagement.

In the manner described above, the coding element 32 is held in the coding element receptacle 70 in a force-locking and/or positive-locking manner, namely exclusively in a force-locking and/or positive-locking manner, i.e., without adhesive.

The first tool element 42 has a thickness 92 in a direction parallel to the coding element receptacle longitudinal axis 76. A length 94 of the coding element 32 in parallel to the coding element receptacle longitudinal axis 76 corresponds to about the thickness 92 of the tool element 42.

In one embodiment, the coding element 32 is additionally secured in the coding element receptacle 70 so that the coding element 32 in the processing position in which the second tool element 44 unblocks the insertion opening 82 cannot fall out of the coding element receptacle 70. In one embodiment, this is achieved by materially bonding the coding element 32 to the first tool element 42 and/or by plastically deforming the coding element 32 with the tool element 42.

In one embodiment, this additional securing is achieved by a thread of the external thread 78 and/or of the internal thread being crushed or destroyed. For example, this may be effected by means of laser welding.

A permanent plastic deformation of the coding element and/or of the tool element 42 in the region in which they are in engagement with one another can permanently prevent a relative movement of the coding element 32 relative to the coding element receptacle 70 and thus relative to the first tool element 42.

Figure 8:
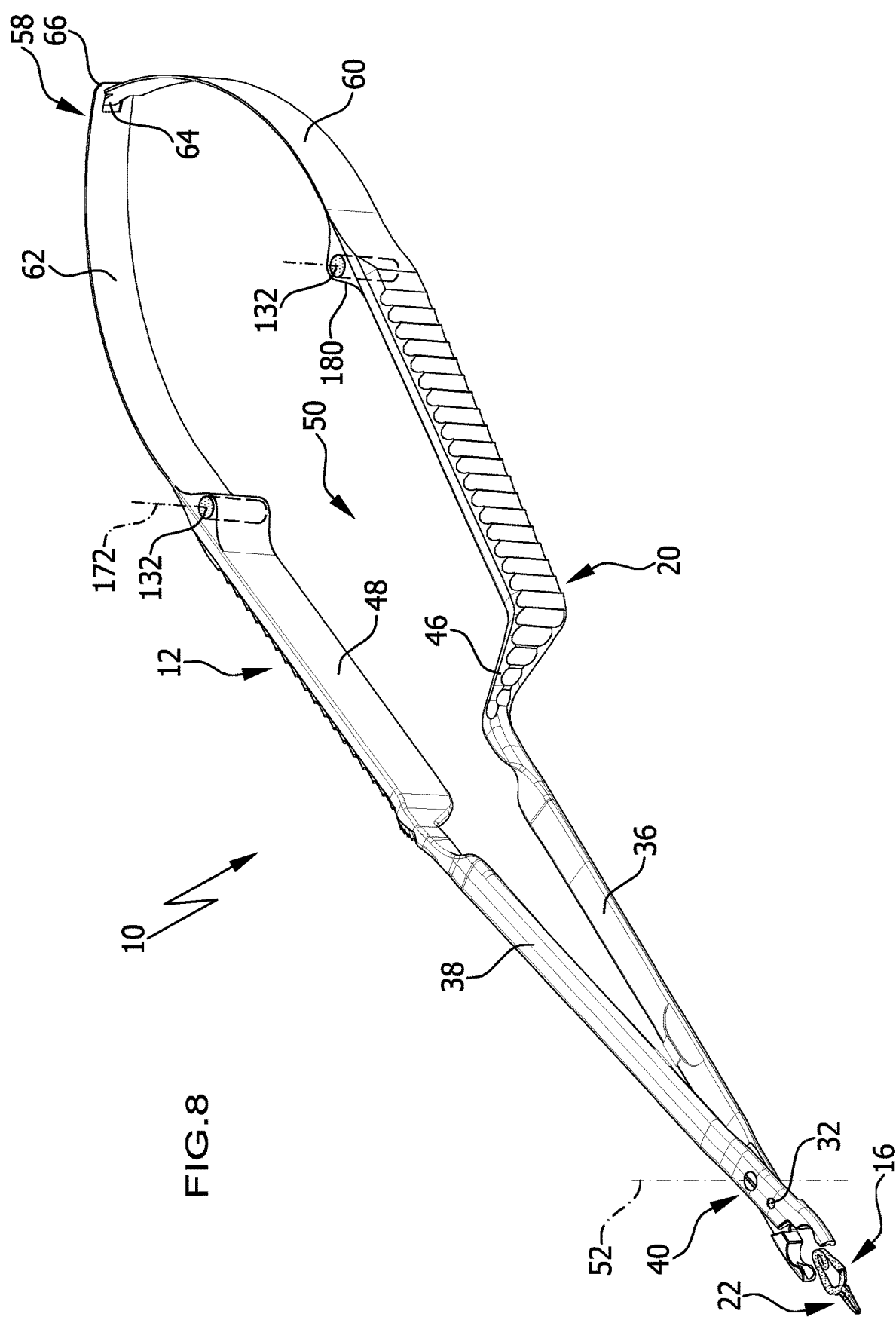
FIG. 8 shows a perspective total view of a further embodiment of an instrument with at least two coding elements.

A further embodiment of a first medical instrument 12 of an implant system 10 is schematically depicted in FIG. 8.

The embodiment of the instrument 12 depicted in FIG. 8 substantially corresponds in its structure with the embodiment of the first medical instrument 12 described with FIGS. 1 to 7. Thus, for the sake of clarity, the same reference numerals are used for identical components and parts. The embodiment in FIG. 8 differs, however, from the embodiment in FIGS. 1 to 7 in that formed on each of two actuating elements 46 and 48 is a respective thickened portion 180 in the form of a rounded projection pointing in the direction toward the respective other actuating element 46 or 48. Formed in each of the two thickened portions 180 is a hollow-cylindrical coding element receptacle 170, which defines a longitudinal axis 172 that extends in parallel to the pivot axis 52.

The two thickened portions 180 are each arranged or formed on the actuating elements 46 and 48 in the transition region to the biasing elements 60 and 62, respectively.

A respective coding element 132 is inserted into the two coding element receptacles 170. The two coding elements 132 correspond to the coding element 32, thus they are, e.g., identically color-coded.

The two additional coding elements 132 that are arranged or formed on the actuating device 50 allow a surgeon to securely handle the corresponding first implant 16 with the instrument 12 even when the coding element 32 is, for example, contaminated or otherwise not visible.

In an alternative embodiment of a medical instrument 12, instead of the two thickened portions 180, as are depicted in FIG. 8, a thickened portion 180 with a coding element 132 is arranged or formed only on one of the two actuating elements 46 or 48.

In the embodiment depicted in the Figures, an end 96 of the coding element 32 pointing away from the second tool element 44 is arranged or formed flush or substantially flush with a side face 98 of the first tool element 42 facing away from the second tool element 44.

In one embodiment, the coding elements 32 and/or 132 are made of a plastic material.

In one embodiment, the coding elements 32 and/or 132 are made of a metal.

The implants 16 and 18 are made of an implant material. The coding elements 32, 132 and 34 are made of a coding element material. In one embodiment, the implant material and the coding element material are identical. This makes it possible, in particular, to design the coding elements 32 and 132 or 34 as well as the implants 16 and 18 to be colored in an identical manner.

In one embodiment, surfaces of the implants 16 and 18 as well as surfaces of the coding elements 32, 132 and 34 are at least partially colored or provided with a colored coating. In one embodiment, the surfaces of the implants 16 and 18 as well as of the coding elements 32, 132 and 34 are completely colored or provided with a colored coating.

In one embodiment, the coding elements 32, 132 and 34 are colored through or have a color-treated surface. The implants 16 and 18 are color-coded in the same manner. A close match of the color codings both of the implants 16, 18 and of the instruments 12, 14 can thus be achieved.

The coding of the instruments 12 and 14 can be further improved if, in addition to the coding element 32 on the first tool element 42, a further coding element is arranged in an analogous manner on the second tool element 44. A coding element arranged on the second tool element 44 is then secured by the first tool element 42 against falling out in the working position.

Figure 4:
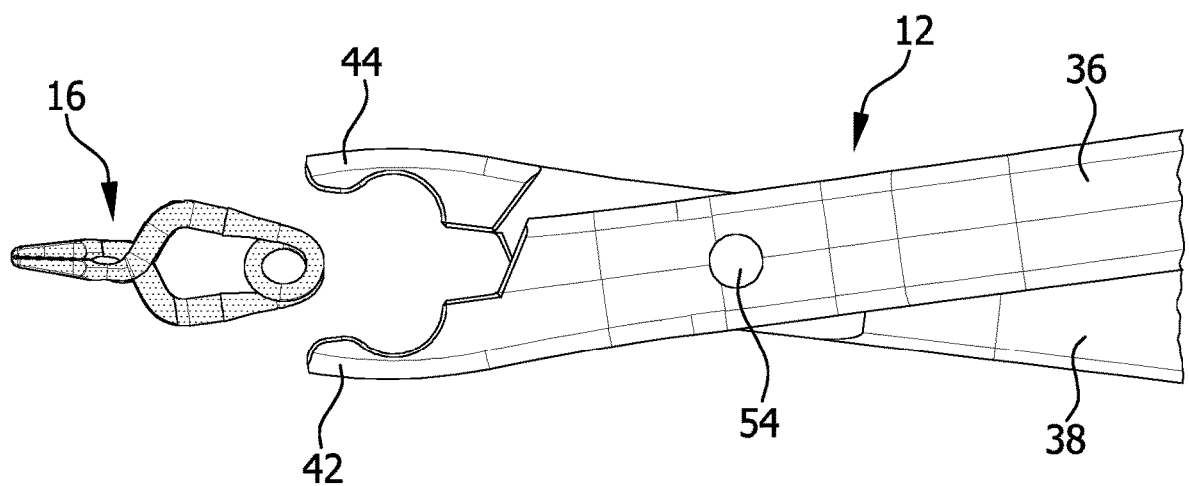
FIG. 4 shows a view in the direction of arrow B in FIG. 2.

Arranging a second coding element on the second tool element 44 has the advantage, in particular, that the coding of the instrument 12 would be visible even in the view that is schematically depicted in FIG. 4. A secure association of the instruments 12 and 14 with the respectively corresponding implant 16 and 18 can thus be achieved.

The implant system 10 may, in principle, comprise any number of implants. In particular, there may be more than two different implants.

Each implant type is preferably color-coded in a different color in the implant system 10. The implant system 10 may, in particular, comprise any number of instruments, i.e., it is not limited to the instruments 12 and 14. The implant system 10 preferably comprises a number of different instruments that corresponds to the number of different implants.

The described coding of the instruments 12 and 14 is not limited to the clip applier 20 that is schematically depicted in the Figures. The coding can also be created in the case of any other instruments in which one of the tool elements, for example the second tool element, of the instrument secures the coding element in the working position on the first tool element against a loss thereof.

The invention claimed is:

1. An implant system comprising at least two differing color-coded implants and comprising at least two differing color-coded medical instruments, wherein a color coding of the at least two instruments corresponds to a color coding of the at least two implants, wherein the coding of the at least two medical instruments comprises at least one coding element, wherein the at least two medical instruments each comprise a first tool element and at least one second tool element for jointly handling one of the at least two implants, wherein the first tool element and the at least one second tool element are movable relative to one another and are arranged or formed on a distal end of the respective instrument, wherein the at least two instruments each comprise an actuating device, which is arranged or formed on a proximal end of the respective instrument and cooperating with the first tool element and the at least one second tool element for moving the first tool element and the at least one second tool element relative to one another as a result of an actuation of the actuating device, wherein the at least one coding element is arranged on the first tool element and wherein the at least one second tool element secures the at least one coding element in a working position of the respective instrument, in which the first tool element and the at least one second tool element are movable relative to one another between a first extreme position and a second extreme position, on the first tool element against a movement in the direction toward the second tool element.

2. The implant system according to claim 1, wherein each instrument comprises at least two coding elements and wherein at least one of the at least two coding elements is arranged at least one of on the first and on the at least one second tool element.

3. The implant system according to claim 1, wherein the first tool element and the at least one second tool element are at least one of:
   a) pivotable relative to one another about a pivot axis; and
   b) movably mounted against one another in a bearing region, wherein the at least one coding element is arranged on the first tool element on the distal side of the bearing region.

4. The implant system according to claim 1, wherein the first tool element has a coding element receptacle and wherein the at least one coding element is at least partially held in the coding element receptacle in at least one of a force-locking and positive-locking manner and by material bond.

5. The implant system according to claim 4, wherein the at least one coding element is at least one of:
   a) held in the coding element receptacle exclusively in at least one of a force-locking and positive-locking manner, or exclusively by material bond; and
   b) screwed into the coding element receptacle.

6. The implant system according to claim 4, wherein the coding element receptacle at least one of:
   a) comprises a perforation; and
   b) defines a coding element receptacle longitudinal axis that extends in parallel or substantially in parallel to the pivot axis.

7. The implant system according to claim 4, wherein the coding element receptacle has a viewing opening pointing away from the at least one second tool element and an insertion opening pointing in the direction toward the at least one second tool element, and wherein a cross sectional area of the viewing opening is smaller than a cross sectional area of the insertion opening.

8. The implant system according to claim 4, wherein the at least one coding element is secured in the coding element receptacle by at least one of material bonding to the first tool element and plastic deformation together with the first tool element.

9. The implant system according to claim 1, wherein an end of the at least one coding element pointing away from the at least one second tool element is arranged or formed flush or substantially flush with a side face of the first tool element facing away from the at least one second tool element.

10. The implant system according to claim 1, wherein at least one of:
    a) the at least one coding element has a tool engagement element pointing in the direction toward the at least one second tool element; and
    b) the at least one coding element is arranged on the at least one coding element further comprises a coding element arranged on the at least one second tool element.

11. The implant system according to claim 1, wherein at least one of the at least two instruments comprises at least two coding elements and wherein at least one of the at least two coding elements is arranged or formed on the actuating device.

12. The implant system according to claim 1, wherein the actuating device comprises two actuating elements that are movable relative to one another.

13. The implant system according to claim 1, wherein the at least two instruments each comprises a biasing device for exerting a biasing force holding the actuating device in an extreme position.

14. The implant system according to claim 1, wherein at least one of:
    a) the at least two instruments are configured in the form of clip appliers;
    b) the at least two implants are configured in the form of surgical clips;
    c) the at least one coding element is made of a plastic material or a metal; and
    d) the at least two implants are made of an implant material, wherein the at least two corresponding coding elements are made of a coding element material, and wherein the implant material and the coding element material are identical.

15. The implant system according to claim 1, wherein at least one of:
    a) a surface of the at least two implants and a surface of the at least two one coding elements are at least partially colored or provided with a colored coating; and
    b) the at least one coding element is colored through or has a color-treated surface and wherein the at least two implants are color-coded in the same manner.

* * * * *